United States Patent [19]

Boots et al.

[11] 4,290,373

[45] Sep. 22, 1981

[54] SEEDLING TRANPLANTER

[75] Inventors: W. Stewart Boots, Belle Glade; Jay C. Altman, Clewiston, both of Fla.

[73] Assignee: Mechanical Transplanter Company, Holland, Mich.

[21] Appl. No.: 105,869

[22] Filed: Dec. 21, 1979

[51] Int. Cl.³ .......................................... A01C 11/00
[52] U.S. Cl. .......................................... 111/3; 111/34
[58] Field of Search .................. 111/2, 3, 4, 34, 74, 111/77, 89, 90, 91

[56] References Cited

U.S. PATENT DOCUMENTS

| | | | |
|---|---|---|---|
| 1,657,944 | 1/1928 | Stocker et al. | 111/3 |
| 2,950,770 | 8/1960 | Wilson | 111/3 X |
| 3,872,805 | 3/1975 | Kolk et al. | 111/2 |
| 4,112,857 | 9/1978 | Bradley | 111/3 |

FOREIGN PATENT DOCUMENTS

| | | | |
|---|---|---|---|
| 2307455 | 12/1976 | France | 111/3 |
| 323547 | 4/1970 | Sweden | 111/3 |
| 408618 | 7/1974 | U.S.S.R. | 111/2 |

*Primary Examiner*—James R. Feyrer

[57] ABSTRACT

A tractor towed seedling transplanter includes a main frame with a pair of canted rear wheels, a rearwardly facing operator's seat and a tray for storing a supply of seedlings to be transplanted. A power take-off from the wheels operates a rotary metering turret supporting a plurality of clam shell type hopper cups which receive individual seedling plants and are opened in proper timed relation by an adjustable cam to deposit individual plants in a vertically disposed feed tube having a lower end positioned above a furrow opened in the soil by a plow positioned forwardly of the canted rear wheels. Adjustment of the cam means permits an accurate release of the seedling plants from the clam shell hopper cups to properly discharge the seedlings into the feed tube for discharge into the furrow which is closed over the root clumps of the seedlings by the canted rear wheels.

10 Claims, 6 Drawing Figures

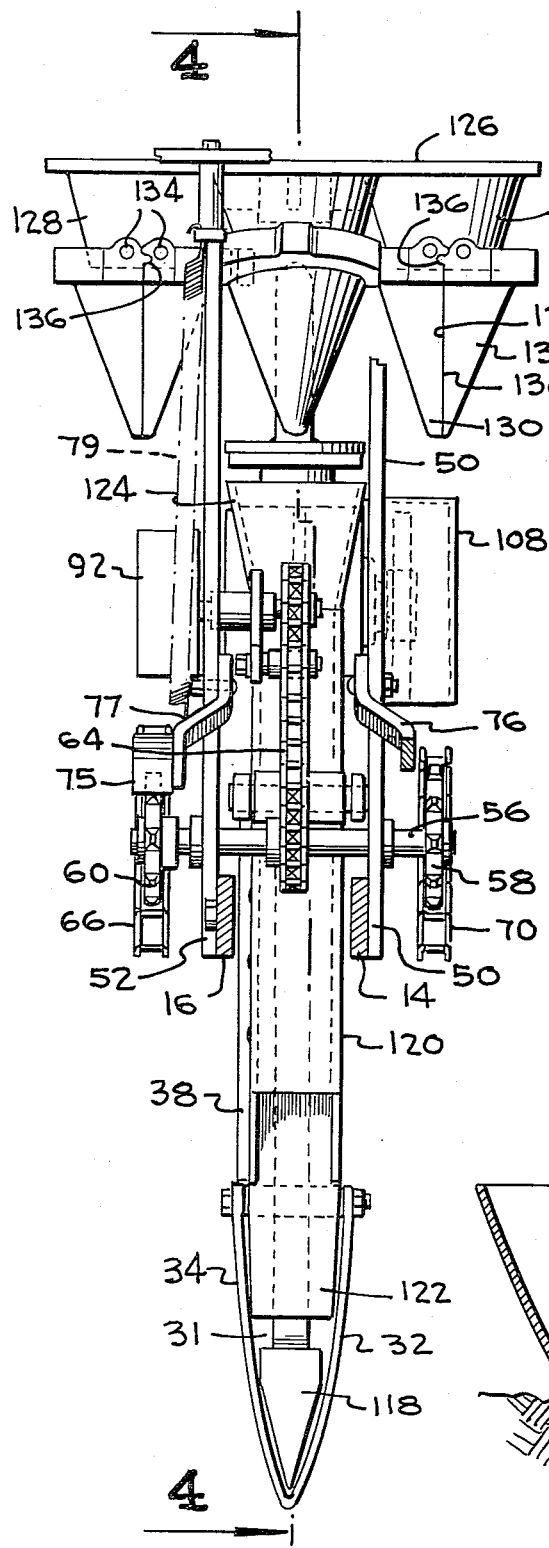
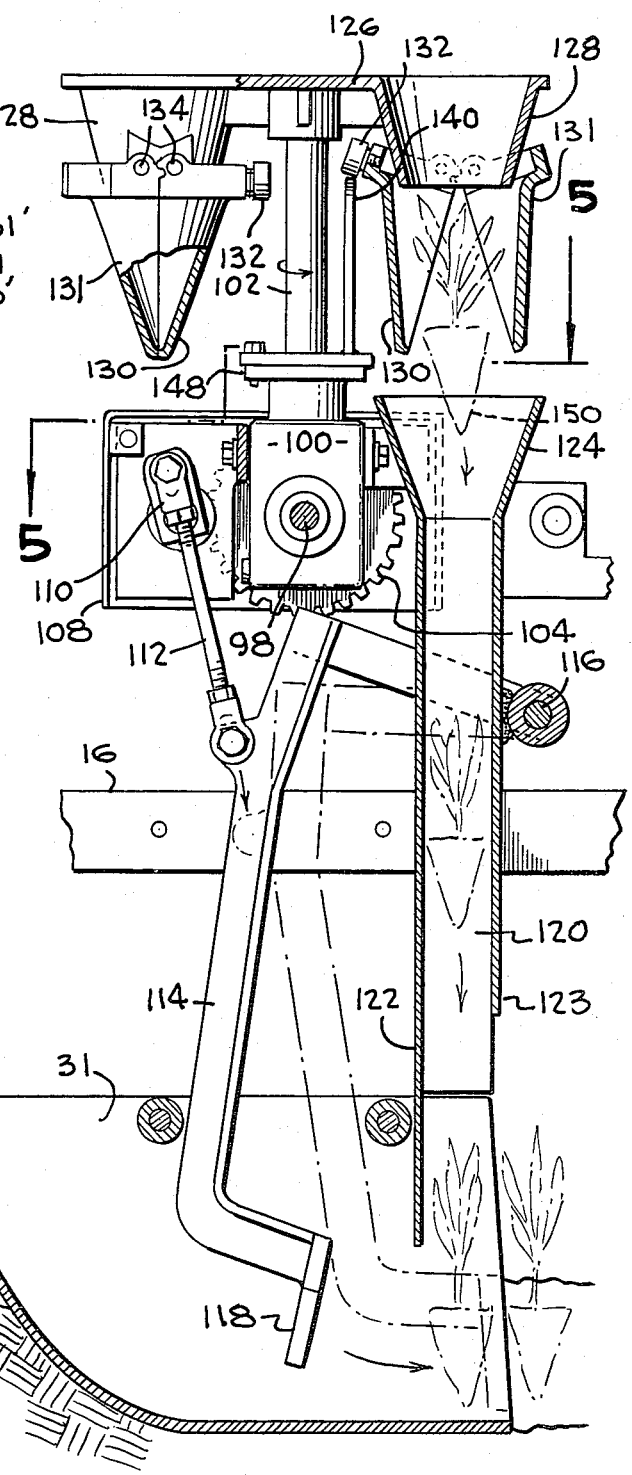
Fig-3
Fig-4

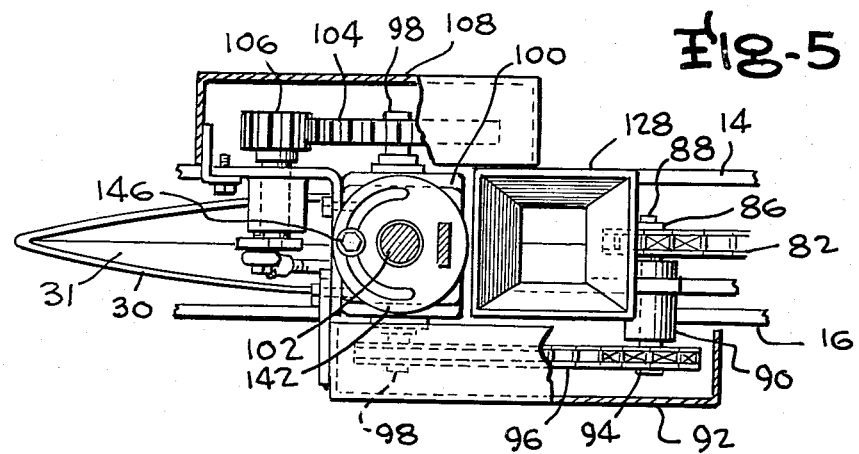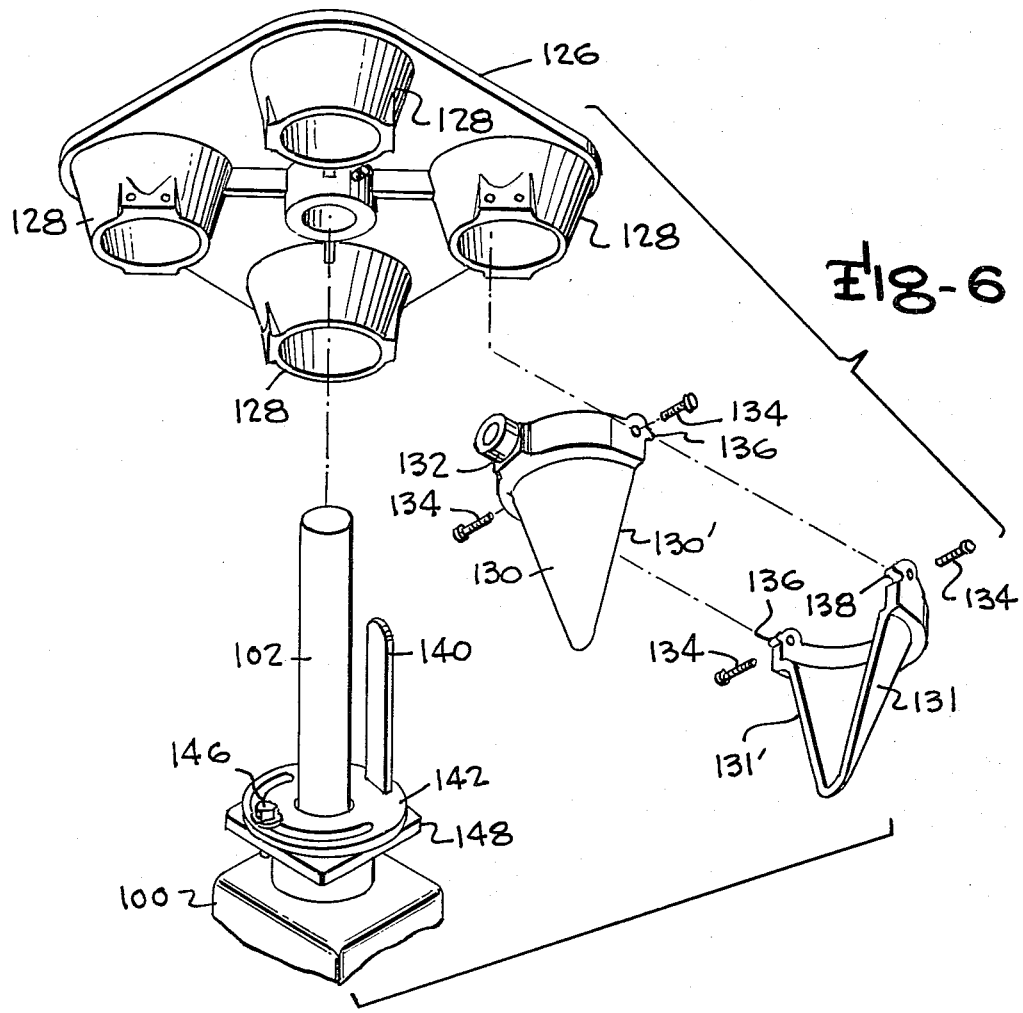

SEEDLING TRANPLANTER

BACKGROUND OF THE INVENTION

The present invention is in the field of agricultural equipment and is more specifically directed to a seedling transplanter for automatically depositing seedlings in a furrow and closing the soil of the furrow over the root clumps of the seedlings.

A wide variety of crops are started in nurseries under ideal controlled conditions to provide robust seedlings which are then set out in fields for growth to maturity. The seedlings are often sold in large lots consisting of many thousands of plants and it is consequently essential that the transplanting operation be effected as quickly as possible in order to minimize the loss of plants both before and after the transplanting operation. In the past, this procedure has necessitated the employment of large numbers of laborers in order to expedite the transplanting operation. Frequently the unavailability of labor and/or the ever increasing cost of labor has created a substantial financial hardship for those engaged in agricultural operations of this type.

A number of machines have consequently been proposed for the purpose of automating transplanting procedures so as to reduce the need for the frequently unavailable and expensive labor. However, the previously proposed machines have suffered from a number of drawbacks such as being overly complicated and consequently expensive to manufacture and maintain. Additionally, the functional results provided by many of the prior machines have not been satisfactory in that they have not provided an accurate foolproof deposit of the seedling plants in the furrow and have in many instances fatally damaged the seedlings in the handling process prior to and during transplantation. Also, many of the prior known devices are capable of usage with only one type of plant and cannot accommodate plants of varying sizes or provide adjustable integral spacing of the plants in the furrow as is frequently required by diverse agricultural operations.

Therefore, it is the primary object of this invention to provide a new and improved seedling transplanter.

Achievement of the foregoing object is enabled by the preferred embodiment which comprises a tractor-towed trailer device having rearwardly positioned canted wheels in front of which a furrow forming plow is mounted on the frame of the device. A vertical turret supporting shaft is driven by a chain drive power take-off from the canted rear wheels and supports a rotary turret at its upper end with the turret including a plurality of conical shaped openable clam shell type cups equidistantly spaced about its periphery for receiving individual seedlings. Rotation of the turret causes cam follower means on each of the clam shell cups to be actuated by an adjustable cam to open the cups to drop the individual seedlings into a vertically extending plant tube. The plant tube opens at its lower end immediately rearward of the furrow forming plow with an oscillating pusher foot engaging the seedling as it is deposited in the furrow to push it rearwardly in a vertical orientation to a position where the canted wheels close the furrow over the root clump of the seedling as the device is progressed forwardly by the towing vehicle.

A better understanding of the preferred embodiment will be achieved when the following detailed description is considered in conjunction with the appended drawings in which like numerals are used for like parts throughout the different figures.

DESCRIPTION OF THE DRAWINGS

FIG. 3 is a sectional view taken along lines 3—3 of FIG. 2;

FIG. 4 is a sectional view taken along lines 4—4 of FIG. 3;

FIG. 5 is a sectional view taken along lines 5—5 of FIG. 4; and

FIG. 6 is an exploded perspective view of the rotary feed turret of the preferred embodiment.

DESCRIPTION OF THE PREFERRED EMBODIMENT

Figure 1:
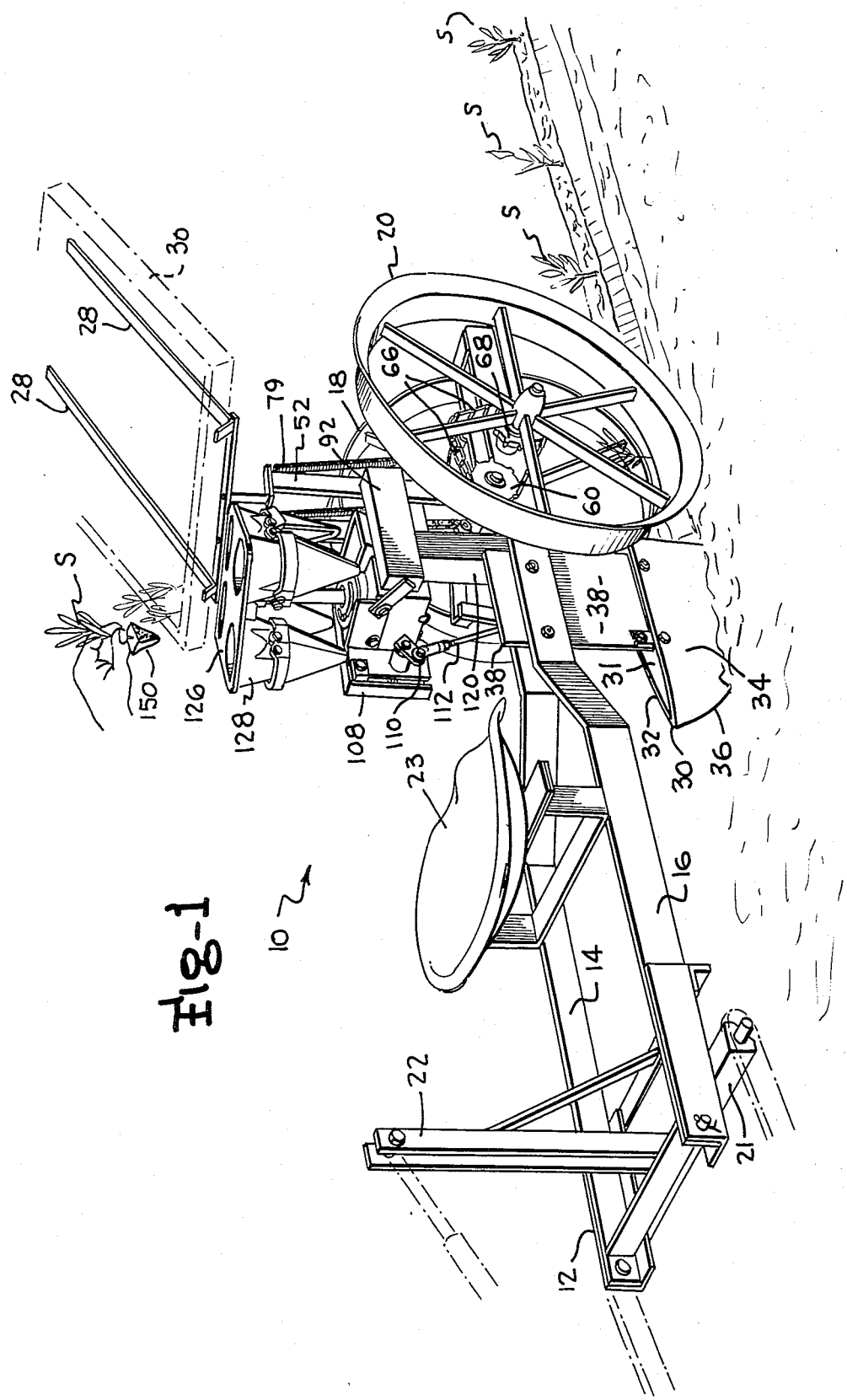
FIG. 1 is a perspective view of the preferred embodiment of the invention.

The preferred embodiment, which is generally designated 10, includes a main longitudinal frame member 12 formed of first and second side rails 14 and 16 as best illustrated in FIG. 1. First and second canted rear wheels 18 and 20 are mounted for rotation adjacent the rearward end portions of the frame 12 with the forward end of the frame including attachment members 21 and 22 adapted to be connected to the conventional three-point hitch of a tractor. However, it should be understood that different attachment means could be employed in accordance with the hitch provided on the particular towing vehicle with which the device is to be used.

Figure 2:
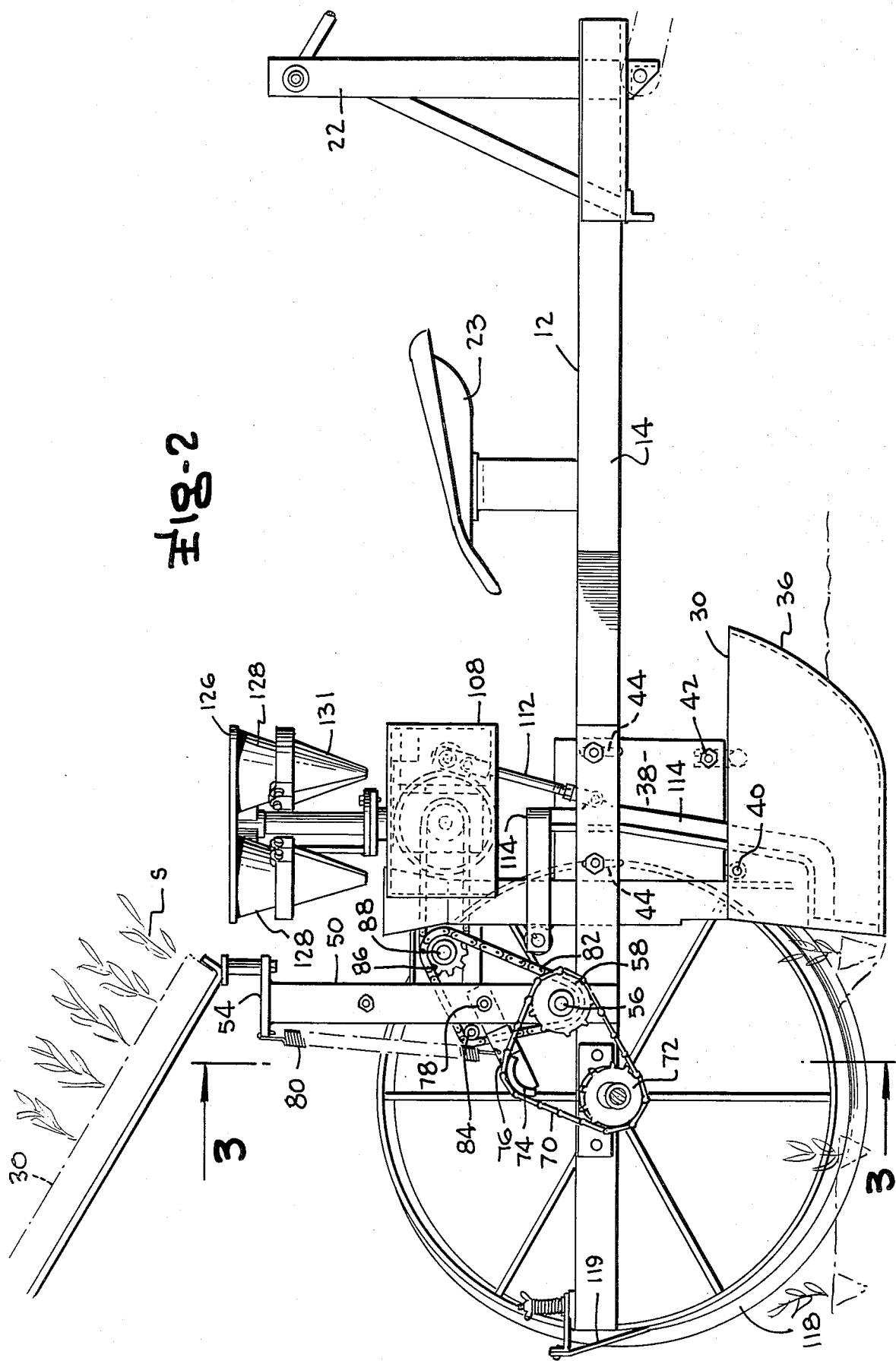
FIG. 2 is a side elevation view of the preferred embodiment.

A rearwardly facing operator's seat 23 is mounted in an intermediate position on the frame 12 so that the operator faces bracket members 28 on which a conventional seedling tray 30 such as that of Todd U.S. Pat. No. 3,667,159 is supported. The seedling tray is within easy reach of the operator's hand as shown in FIG. 1. A furrow opening plow 30 consisting of side plates 32 and 34 welded together along a front apex edge 36 and having a hollow internal chamber 31 is supported on the lower end of an adjustable support plate 38 extending downwardly from the main frame 12 as shown in FIGS. 1 and 2. Furrow opening plow 30 is mounted for pivotal movement about a pivot axis 40 on the lower end of the support plate 38 and is held in adjusted rotational position by nut means 42 as shown in FIG. 3. Additionally, support plate 38 includes adjustment slots 44 which permit it to be adjusted vertically as required by the particular depth of furrow needed for the particular seedlings S to be transplanted.

First and second vertically extending frame plates 50 and 52 are welded respectively to the outer sides of the side rails 14 and 16 and extend upwardly therefrom as best shown in FIGS. 2 and 3. A cap plate 54 welded to the upper ends of the vertically extending frame plates 50 and 52 provides support for the plant flat supporting brackets 28. Additionally, a transverse shaft 56 is mounted on the frame plates 50 and 52 and supports external sprockets 58 and 60 as shown in FIG. 3. Additionally, shaft 56 also supports a central sprocket 62 over which a chain 64 extends.

A drive chain 66 is positioned about sprocket 60 and an output drive sprocket 68 coaxially affixed to the wheel 20 while a further drive chain 70 similarly extends about sprocket 58 and an output drive sprocket 72 coaxially mounted on the wheel 18. Tension is maintained in chain 66 by a tension plate 74 mounted on a pivot lever 76 for pivotal movement about pin 78 under the urging of a tension spring 80 as shown in FIG. 2 while a similar tension plate 75 mounted on pivot lever 77 hold chain 70 in tension by the action of a tension spring 79.

A chain 82 extends about the central sprocket 62, an idler 84 and a sprocket 86 keyed to a shaft 88 mounted in a bearing 90 with the opposite end of shaft 88 being positioned in a housing 92. A sprocket 94 is keyed to the end of shaft 88 and drives a chain 96 which in turn drives a sprocket keyed to a shaft 98 (FIG. 5) extending through and mounted on a housing 100 (FIG. 4). A vertical turret support shaft 102 is mounted in bearings in housing 100 and has its inner end inside the housing with bevel gears (not shown) respectively provided on shafts 98 and 102 being in mesh so that power from the wheels 18 and 20 is conveyed through the various sprocket and chains to effect rotation of the vertical shaft 102.

Additionally, shaft 98 drives a gear 104 keyed to the shaft and meshing with a second gear 106 enclosed in a 108. Gear 106 is keyed to a shaft having an eccentric drive lever 100 keyed to its opposite end. An adjustable drive link 112 is connected on one end to the eccentric drive link 110 and on its opposite end to a swing lever 114 pivotally supported on pivot pin 116 and having a kicker foot 118 at its lower end. It will be observed that rotation of shaft 98 etc. consequently effects swinging movement of the swing lever 114 between the solid line position and the dotted line position of FIG. 4. Scrapers 119 engage wheels 18 and 20 to remove any adhering mud or the like.

A vertically extending plant discharge tube 120 of square cross-sectional configuration is welded along one side to the support plate 38 as shown in FIG. 3. Tube 120 is open at its lower end with its forward wall 122 extending downwardly inside the chamber 31 between the elements of the furrow forming plow 30 as shown in FIG. 4 with the opposite trailing side 123 of the tube terminating upwardly above the plow. Tube 120 has a flared upper end 124 positioned beneath a rotary turret 126 mounted on the upper end of the turret support shaft 102.

A plurality of downwardly extending conical shaped funnel-like plant guides 128 extend integrally downwardly from the turret 126. Each funnel-like guide 128 supports a clam shell type plant dispensing cup of conical configuration consisting of a first pivotal cup-half 130 and a second pivotal cup-half 131. The cup-half members 130 and 131, when closed, are of inverted cone shape with the cup-halves being separated at facing surfaces 130' and 131' in a bisecting plane extending through the axis of the cone shape. Each cup-half is mounted to pivot about two pivot pins 134 mounted on the funnel guides 128 closely adjacent the facing surface of the respective cup-half. It should be observed that cup-halves 130 and 131 each have a male projection 136 received in a slot 138 of the other cup-half member as shown in FIGS. 4 and 6.

Cup-half 130 is pivoted from the position illustrated in FIG. 3 to the position illustrated in FIG. 4 by a cam follower roller 132 mounted on a pin on the upper end of cup-half 130. Rotation of turret 126 causes roller 132 to engage a timing cam 140 extending upwardly from a circular support bracket 142 encircling shaft 102 and held in adjusted rotary position by a clamp bolt 146 extending through a fixedly positioned head flange 148 provided on the upper end of the housing 100 as best shown in FIG. 6.

Thus, as the apparatus is moved across the surface of the field to be planted, the turret 126 is rotated to cause the cam follower roller 132 of each cup-half 130 once during each rotation of turret 126 so as to open it and simultaneously open the other cup-half 131 in an opposite direction by virtue of the intersection of projections 136 with slots 138 in the manner illustrated by the sectioned cup of FIG. 4. The cup is opened in position immediately above the flared opening in the upper end 124 of the plant discharge tube 120. However, the position of the cam 140 can be adjusted to accurately insure that the seedling S carried in the cup is released when over the end 128 of tube 120. This adjustment feature is important since each seedling includes a root clump 150 and the root clumps of one group of seedlings will be substantially different in size from those of another different type of seedlings due to the fact that the seedling is not released until the members 130 and 131 have reached a partially open release position in which the opening between them is equal to the largest dimension of the root clump. It is essential that the cam 140 be adjusted to effect the required partially open release position when over tube 120. Consequently, providing of the adjustable cam 140 permits the apparatus to be accurately timed so that seedlings of a particular root clump size are released at exactly the proper moment to fall into the upper flared end 124 of the plant discharge tube 120.

Seedlings deposited in the upper end of tube 120 fall from the lower end of the tube as shown in FIG. 4 and the kicker foot 118 is operated in timed sequence so as to kick the seedling backwardly into the furrow immediately to the rear of the furrow forming plow 30 with the canted wheels 18 and 20 serving to close the furrow over the plant as the apparatus moves forwardly along the row being planted. The operator continues to position new seedlings in the funnel guide member 128 so that the seedlings are equidistantly planted along the row as shown in FIG. 1.

Numerous modifications of the preferred embodiment will undoubtedly occur to those of skill in the art and it should therefore be understood that the spirit and scope of this invention is to be limited solely by the appended claims.

We claim:

1. A seedling transplanter comprising a main longitudinally extending frame, hitch means at a front end of said main longtidunally extending frame for attachment to a tow vehicle, a pair of oppositely canted wheels rotatably fixed to a rear end portion of said frame, hollow plow means depending downwardly from said frame and having a rearwardly open internal chamber for forming a furrow in the soil as said frame is moved by the two vehicle, rotatable turret means including a plurality of selectively openable cups spaced equidistantly about said turret and each of which is adapted to receive a manually inserted seedling in a generally upright position, a fixed discharge tube fixedly positioned with respect to said frame and extending from a position beneath said turret into said internal chamber in said plow means, drive means for said rotatable turret to sequentially align each of said cups with said fixed discharge tube, said cups each including facing cup-halves defining the bottom of each of said cups, and cam means to sequentially simultaneously open both of said cup-halves of each of said cups is aligned with said discharge tube to drop a seedling disposed therein into said discharge tube for movement through said tube into said chamber of said plow and oscillating kicker means having a lower end positioned for movement in said chamber for engaging each seedling in the chamber for moving each seedling rearwardly from said chamber into the furrow, said oppositely canted wheels being disposed to close the furrow over the root clump of the seedlings.

2. The seedling transplanter device as defined in claim 1 wherein said turret is disposed in a generally horizontal plane.

3. The seedling transplanter as defined in claim 2 wherein said drive means includes a vertically extending shaft having said turret attached to its upper end, and a drive train including sprocket and chain drive means connecting said vertically extending shaft to said pair of wheels.

4. The seedling transplanter as defined in claim 3 wherein said discharge tube is vertically disposed and of square cross-section having a forward wall extending into said internal chamber at its lowest extent.

5. The seedling transplanter of claim 1 wherein said cups are of inverted cone shape with said cup-halves having facing surfaces in a bisecting plane extending through the axis of said cone shape and further including first and second parallel pivot supports on said turret for each of said cup-halves supporting each of said cup-halves at opposite sides on their upper portions closely adjacent said facing surfaces, one of said cup-halves of each cup having a cam follower engageable with said cam means to effect opening movement of said cup-half and an interconnecting drive means between said cup-halves of each cup for simultaneously effecting opposite opening pivotal movement of the other cup-half in response to said opening movement of said one cup-half.

6. The seedling transplanter of claim 5 additionally including selectively adjustable positioning means for adjusting the position of said cam means with respect to said turret so as to adjust the angular position of the turret at which the cup-halves open to release a seedling held therein.

7. The seedling transplanter of claim 4 wherein said cups are of inverted cone shape with said cup-halves having facing surfaces in a bisecting plane extending through the axis of said cone shape and further including first and second parallel pivot supports on said turret for pivotally supporting each of said cup-halves at locations adjacent their uppermost extent and also closely adjacent said facing surfaces, one of said cup-halves of each cup having a cam follower engageable with said cam means to effect opening movement of said cup-half and an interconnecting drive means between said cup-halves of each cup for simultaneously effect opposite pivotal movement of the other cup-half in response to said opening movement of said one cup-half.

8. The seedling transplanter of claim 7 additionally including selectively adjustable positioning means for adjusting the position of said cam means with respect to said turret so as to adjust the angular position of the turret at which the cup-halves open to release a seedling held therein.

9. The seedling transplanter of claim 8 wherein said kicker means includes a kicker plate mounted on the lower end of a swing lever in said internal chamber and further including oscillation drive means for oscillating said swing lever in timed relation to the opening movement of said cup-halves.

10. The seedling transplanter of claim 9 wherein said cam means comprises a vertical cam plate positioned adjacent said vertically extending shaft for rotational adjustment about the axis of said vertically extending shaft.

* * * * *